(12) United States Patent
Kusano

(10) Patent No.: US 7,530,649 B2
(45) Date of Patent: May 12, 2009

(54) BRAKE APPARATUS FOR A VEHICLE

(75) Inventor: Akihito Kusano, Toyota (JP)

(73) Assignee: Advics Co., Ltd., Kariya, Aichi Pref. (JP)

( * ) Notice: Subject to any disclaimer, the term of this patent is extended or adjusted under 35 U.S.C. 154(b) by 36 days.

(21) Appl. No.: 11/378,318

(22) Filed: Mar. 20, 2006

(65) Prior Publication Data

US 2006/0214504 A1   Sep. 28, 2006

(30) Foreign Application Priority Data

Mar. 22, 2005   (JP)   ............... 2005-081051

(51) Int. Cl.
*B60T 8/64* (2006.01)
*B60T 8/40* (2006.01)

(52) U.S. Cl. .............. 303/151; 303/152; 303/155; 303/113.3; 303/114.1; 303/116.4; 303/116.1; 303/16

(58) Field of Classification Search .............. 303/114.1, 303/155, 113.3, 151, 116.1, 116.4, 152, 116.6, 303/166
See application file for complete search history.

(56) References Cited

U.S. PATENT DOCUMENTS

| | | | | |
|---|---|---|---|---|
| 4,018,486 A | * | 4/1977 | Sutton | ............... 303/195 |
| 4,962,969 A | * | 10/1990 | Davis | ............... 303/3 |
| 5,050,936 A | * | 9/1991 | Tanaka et al. | ............... 303/3 |
| 5,531,509 A | * | 7/1996 | Kellner et al. | ............ 303/114.1 |
| 5,542,754 A | * | 8/1996 | Aoki et al. | ............... 303/3 |
| 5,568,962 A | * | 10/1996 | Enomoto et al. | ............ 303/3 |
| 6,196,643 B1 | * | 3/2001 | Yokoyama et al. | ............ 303/166 |
| 6,217,133 B1 | * | 4/2001 | Yoshida | ............ 303/113.4 |
| 6,402,267 B2 | * | 6/2002 | Tanaka et al. | ............ 303/155 |
| 6,412,882 B1 | * | 7/2002 | Isono et al. | ............ 303/114.1 |
| 6,604,795 B2 | * | 8/2003 | Isono et al. | ............ 303/11 |
| 6,863,355 B2 | * | 3/2005 | Nishio et al. | ............ 303/140 |

FOREIGN PATENT DOCUMENTS

JP   2000-219114 A   8/2000

* cited by examiner

*Primary Examiner*—Robert A Siconolfi
*Assistant Examiner*—Mahbubur Rashid
(74) *Attorney, Agent, or Firm*—Buchanan Ingersoll & Rooney PC

(57) ABSTRACT

When a stroke of a manually operated braking member is equal to or smaller than a predetermined stroke, a master pressure chamber of a master cylinder is communicated with an atmospheric pressure reservoir, and an electromagnetic valve and a hydraulic pressure pump are controlled to supply the hydraulic pressure to wheel brake cylinders according to an amount of operation of the manually operated braking member detected by a braking operation detection device. An orifice is provided in a passage between the master pressure chamber and the atmospheric pressure reservoir, and a check valve is disposed in parallel with the electromagnetic valve to allow a flow of the brake fluid from the master cylinder to the wheel brake cylinders, and prohibit its reverse flow.

8 Claims, 6 Drawing Sheets

BRAKE APPARATUS FOR A VEHICLE

This application claims priority under 35 U.S.C. Sec. 119 to No. 2005-081051 filed in Japan on Mar. 22, 2005, the entire content of which is herein incorporated by reference.

BACKGROUND

The present invention relates to a brake apparatus for a vehicle, and more particularly to the apparatus provided with a regenerative braking device and a hydraulic pressure braking control device, to achieve a regenerative braking cooperative control.

In general, as for a brake apparatus for use in a hybrid vehicle having an engine and an electric motor, the regenerative braking device and hydraulic pressure braking control device are provided to achieve the regenerative braking cooperative control. For example, Japanese Patent Laid-open Publication No. 2000-219114 discloses a brake-by-wire type service brake for vehicles such as an electric vehicle or hybrid electric vehicle, having a regenerative braking system for collecting brake energy by means of a DC motor used for a generator, and a hydraulic brake system actuated by hydraulic pressure discharged from a hydraulic pressure pump, to improve a feeling of operation of a brake pedal. In the Publication, it is described that a master cylinder is not operated by the brake pedal at a normal reduced speed range of the vehicle with the brake pedal being depressed, whereas the master cylinder is operated by the brake pedal at a highly reduced speed range of the vehicle with the brake pedal being largely depressed, to increase the hydraulic pressure.

According to the brake apparatus as disclosed in the aforementioned Publication, the hydraulic pressure pump can be controlled to supply the hydraulic pressure according to an amount of operation of a manually operated braking member into wheel brake cylinders, when a stroke of the manually operated braking member is equal to or smaller than a predetermined stroke. However, the brake apparatus has been constituted such that the hydraulic pressure will not be supplied into the wheel brake cylinders, in such a range that the stroke of the manually operated braking member is equal to or smaller than the predetermined stroke. Therefore, if the manually operated braking member is rapidly operated in that range, the regenerative braking device or the hydraulic pressure pump may be delayed in operation, whereby an unusual feeling might be given to a vehicle driver.

SUMMARY

Accordingly, it is an object of the present invention to provide a brake apparatus capable of performing a regenerative braking cooperative control for a vehicle, to perform a braking operation appropriately, without giving an unusual feeling to a vehicle driver, even in the case where the vehicle driver has operated a manually operated braking member rapidly, in such a range that a stroke of the manually operated braking member is equal to or smaller than a predetermined stroke.

In accomplish the above and other objects, a brake apparatus comprises a master cylinder having a master piston moved in response to operation of a manually operated braking member, and a master pressure chamber for generating hydraulic pressure according to an amount of operation of the manually operated braking member including a stroke of the manually operated braking member, wheel brake cylinders operatively mounted on wheels of the vehicle for applying braking force to the wheels, with the hydraulic pressure fed from the master cylinder, and an atmospheric pressure reservoir for storing brake fluid to supply the brake fluid to the master cylinder. The master pressure chamber is communicated with the atmospheric pressure reservoir, when the stroke of the manually operated braking member is equal to or smaller than a predetermined stroke. The apparatus further comprises an electromagnetic valve disposed in a passage between the master cylinder and the wheel brake cylinders, a braking operation detection device for detecting the amount of operation of the manually operated braking member, a hydraulic pressure pump with an output port thereof connected to a passage between the electromagnetic valve and the wheel brake cylinders, and a control unit for controlling the electromagnetic valve and the hydraulic pressure pump to supply the hydraulic pressure to the wheel brake cylinders according to the amount of operation of the manually operated braking member detected by the braking operation detection device, when the stroke of the manually operated braking member is equal to or smaller than the predetermined stroke. And, the brake apparatus further comprises an orifice provided in a passage between the master pressure chamber and the atmospheric pressure reservoir, and a first check valve disposed in parallel with the electromagnetic valve to allow a flow of the brake fluid from the master cylinder to the wheel brake cylinders, and prohibit a reverse flow of the brake fluid.

Preferably, the hydraulic pressure pump has an input port connected to a passage between the master cylinder and the electromagnetic valve. The brake apparatus may further comprise a second check valve disposed in parallel with the orifice to allow a flow of the brake fluid from the atmospheric pressure reservoir to the master pressure chamber, and prohibit a reverse flow of the brake fluid.

Or, the brake apparatus may further comprise a stroke simulator for producing reaction force according to the stroke of the manually operated braking member.

The brake apparatus may further comprise an assisting device disposed between the manually operated braking member and the master cylinder for assisting the operation of the manually operated braking member.

And, the brake apparatus may further comprise a regenerative braking device for collecting braking energy when the vehicle is braked, and the predetermined stroke may be set to be larger than the stroke of the manually operated braking member provided when the regenerative braking device generates a maximal regenerative braking force.

BRIEF DESCRIPTION OF THE DRAWINGS

The above stated objects and following description will become readily apparent with reference to the accompanying drawings, wherein like reference numerals denote like elements, and in which.

DETAILED DESCRIPTION OF EMBODIMENT

Figure 1:
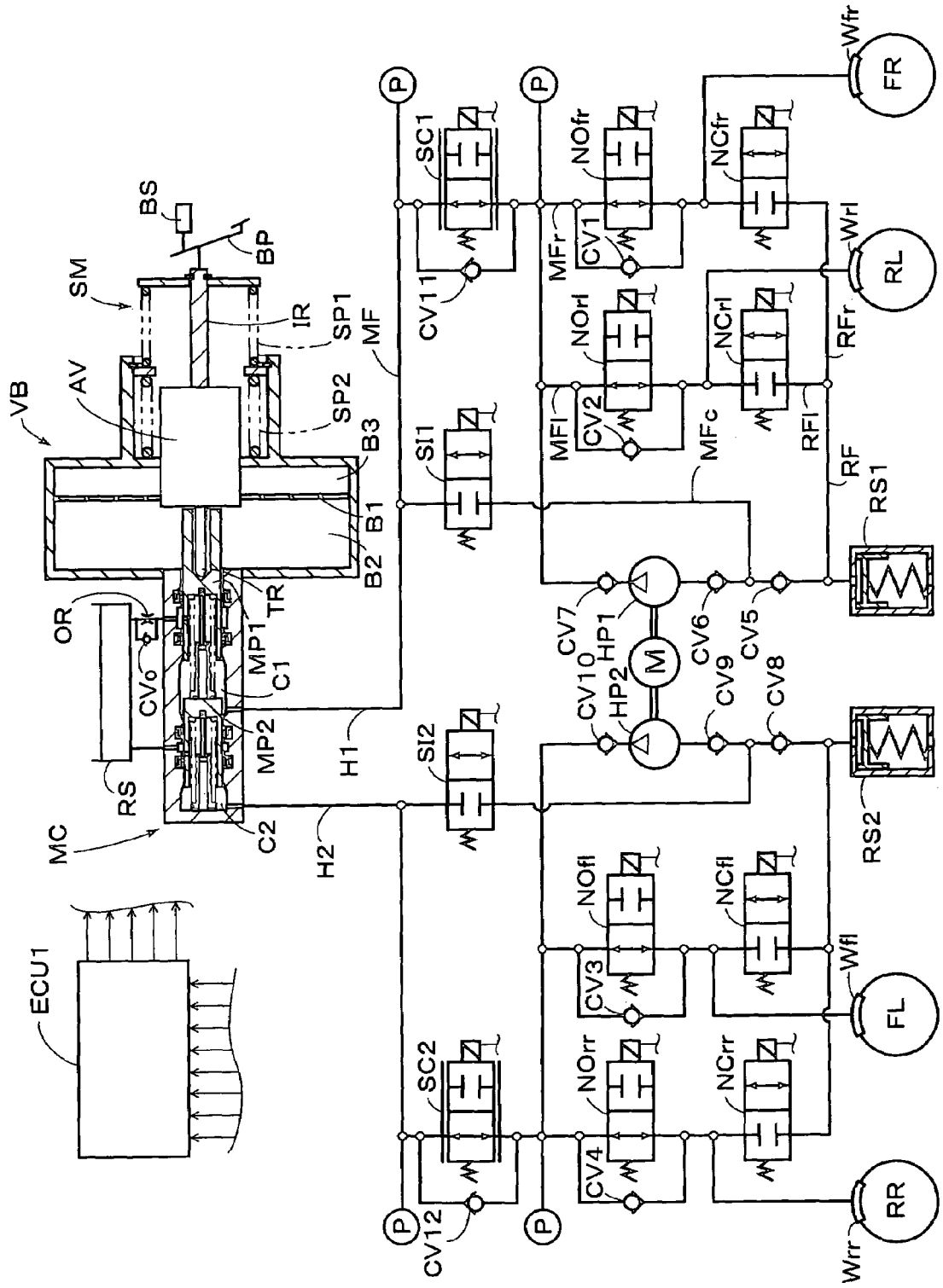
FIG. 1 is a schematic view of a hydraulic pressure braking control section of a brake apparatus according to an embodiment of the present invention.

Referring to FIG. 1, there is illustrated a brake apparatus for a vehicle according to an embodiment of the present invention, which is capable of controlling electrically hydraulic pressure generated according to an amount of operation of a brake pedal BP served as a manually operated braking member, and which is preferable for a regenerative braking cooperative control for a hybrid vehicle having an engine and an electric motor, as will be described later with reference to FIG. 7.

At the outset, referring to FIG. 1, will be explained a hydraulic pressure braking control device for use in the present invention, wherein a master cylinder MC is activated by a vacuum booster VB in response to depression of the brake pedal BP, to pressurize the brake fluid supplied from an atmospheric pressure reservoir RS, and discharge a master cylinder pressure. The master cylinder MC has master pistons MP1 and MP2 advanced in response to operation of the brake pedal BP, and master pressure chambers C1 and C2 for generating hydraulic pressure according to the amount of operation of the brake pedal BP, whereby the brake fluid supplied from the atmospheric pressure reservoir RS into the master pressure chambers C1 and C2 is pressurized in response to operation of the master pistons MP1 and MP2, to be discharged. The master cylinder MC is connected to the atmospheric pressure reservoir RS, and connected to wheel brake cylinders Wfr and so on, through two hydraulic pressure circuits H1 and H2. With the hydraulic brake pressure supplied from the master cylinder MC to the wheel brake cylinders Wfr and so on, respectively, the braking force is applied to each wheel.

Furthermore, linear proportioning solenoid valves SC1 and SC2 served as the electromagnetic valves are disposed on the passages between the master cylinder MC and the wheel brake cylinders Wfr and so on, and there are disposed hydraulic pressure pumps HP1 and HP2, with output ports thereof connected to the passages between the linear proportioning solenoid valves SC1 and SC2, and the wheel brake cylinders Wfr and so on. The brake pedal BP is provided with a stroke sensor BS served as the braking operation detection device for detecting the amount of operation of the brake pedal BP. When the stroke of the brake pedal BP is equal to or smaller than a predetermined stroke, the master pressure chambers C1 and C2 are adapted to be communicated with the atmospheric pressure reservoir RS. The linear proportioning solenoid valves SC1 and SC2, and the hydraulic pressure pumps HP1 and HP2 are controlled to supply the hydraulic pressure to the wheel brake cylinders Wfr and so on, according to the amount of operation of the brake pedal BP, when the stroke of the brake pedal BP is equal to or smaller than the predetermined stroke. The signal detected by the stroke sensor ST is fed to an electronic control unit ECU1 for use in a braking control, together with signals detected by pressure sensors (indicated by "P" in FIG. 1) including pressure sensors for monitoring the braking pressure discharged from the master cylinder MC (hereinafter, referred to as master cylinder pressure), and pressure sensors for monitoring the braking pressure discharged from the hydraulic pressure pumps HP1 and HP2.

Figure 2:
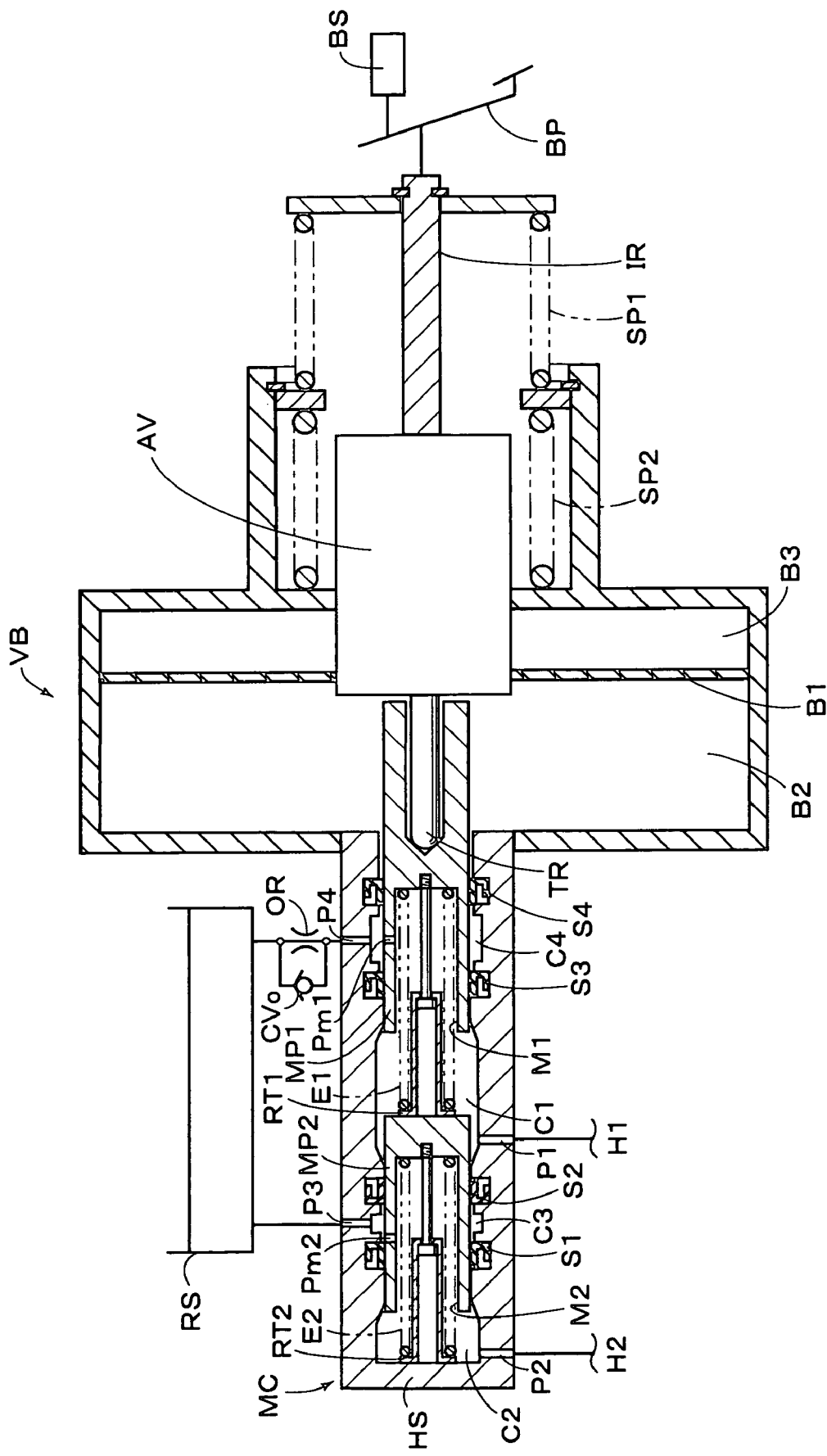
FIG. 2 is an enlarged sectional view of a part of a brake apparatus acting as a hydraulic pressure generating device according to an embodiment of the present invention.

As shown in FIGS. 1 and 2, an orifice OR is provided in a passage between the master pressure chamber C1 and the atmospheric pressure reservoir RS. And, check valves CV11 and CV12 are disposed in parallel with the linear proportioning solenoid valves SC1 and SC2, respectively, to serve as the first check valve for allowing the flow of the brake fluid from the master cylinder MC to the wheel brake cylinders Wfr and so on, and prohibiting its reverse flow. Furthermore, a check valve CVo is disposed in parallel with the orifice OR, to serve as the second check valve for allowing the flow of the brake fluid from the atmospheric pressure reservoir RV to the master pressure chamber C1, and prohibiting its reverse flow.

Between the master cylinder MC and the brake pedal BP, there is disposed a vacuum booster VB served as the assisting device. In the regenerative braking cooperative control, for example, it is required to regulate the hydraulic pressure, so as to prevent the hydraulic pressure corresponding to the regenerative braking force from being supplied, which will result in shortening the stroke of the brake pedal BP by the reduced amount of the hydraulic pressure. Even in this case, in order to provide the stroke of the brake pedal BP including the stroke for the regenerative braking force as described above, a port idle in the master pressure chamber C1 has been expanded. Also, in order to apply the reaction force according to the stroke of the brake pedal BP, there are disposed between the master cylinder MC and the brake pedal BP, a stroke simulator SM having a first simulator spring SP1 and a second simulator spring SP2, whose mounting load and spring constants will be explained later.

As enlarged in FIG. 2, the master cylinder MC has a cylinder housing HS (hereinafter, simply referred to housing HS), in which the master pistons MP1 and MP2 are slidably accommodated, so that the master pressure chamber C1 is defined between the master pistons MP1 and MP2, and the master pressure chamber C2 is defined between the front end portion of the housing HS and the master piston MP2. The master piston MP1 is connected at its rear end, through a transmitting rod TR, to a vacuum booster VB served as the assisting device. The vacuum booster VB is schematically shown in FIGS. 1 and 2, and illustrated in detail in FIG. 4. Like prior vacuum boosters, the vacuum booster VB has such a fundamental structure that a constant pressure chamber B2 and a variable pressure chamber B3 are defined by a movable wall B1. The constant pressure chamber B2 is communicated with an intake manifold of an engine as indicated by ENG in FIG. 7 to provide a negative pressure, and the variable pressure chamber B3 is regulated by a regulator valve AV to produce a pressure difference for actuating the movable wall B1. As for the assisting device, a hydraulic booster (not shown) may be used. Either assisting device can appropriately reduce the force required for the braking operation by the vehicle driver.

The housing HS is a cylinder with a bottom having a closed front end as shown at the left side in FIGS. 1 and 2, and formed with a stepped cylinder bore, whose inner surface are formed with annular grooves for receiving annular sealing members S1-S4. An atmospheric pressure chamber C3 is defined between the sealing members S1 and S2, and an atmospheric pressure chamber C4 is defined between the sealing members S3 and S4. The master piston MP1 is formed with a recess M1 opening forward, and formed at its side surface with a port Pm1 opening into the recess M1. The master piston MP2 is formed with a recess M2 opening forward, and formed at its side surface with a port Pm2 opening into the recess M2. As shown in FIG. 2, the ports Pm1 and Pm2 are placed to be communicated with the atmospheric pressure chambers C4 and C3, respectively, when the master pistons MP1 and MP2 are placed in their initial positions.

As described before, the port idle in the master pressure chamber C1 has been expanded, so as to communicate the master pressure chamber C1 with the atmospheric pressure chamber C4, when the stroke of the brake pedal BP is equal to or smaller than the predetermined stroke. In other words, a long port idle is formed between the sealing members S3 and S4 to extend in the longitudinal direction. And, the predetermined stroke does not mean an ordinary idle stroke, but means such a stroke that a predetermined braking force is produced by means of a regenerative braking device or the like. According to the present embodiment, the predetermined stroke is set to be larger than the stroke for producing a maximal regenerative braking force.

As shown in FIG. 2, a compression spring E1 served as a return spring is disposed between the master pistons MP1 and MP2, through a retainer RT1, and a compression spring E2 served as the return spring is disposed within the recess M2 of the master piston MP2, through a retainer RT2. The load for mounting the compression spring E2 in the master pressure chamber C2 has been set to be larger than the load of the compression spring E2 provided when the port Pm1 in the master pressure chamber C1 was closed.

With respect to the first simulator spring SP1 and second simulator spring SP2, the mounting load for the second simulator spring SP2 has been set to be compressed when the brake pedal BP was depressed to exceed the above-described predetermined stroke. The spring constant of the second simulator spring SP2 has been set to be smaller than the spring constant of the first simulator spring SP1. Consequently, when the brake pedal BP is depressed to exceed the predetermined stroke, loss of input load to the vacuum booster VB can be restrained. Although the simulator springs SP1 and SP2 are disposed between the brake pedal BP and the vacuum booster VB according to the present embodiment, the compression spring E1 in the master pressure chamber C1 can be served as the simulator spring.

Next will be explained the hydraulic pressure control system as shown in FIG. 1. According to the present embodiment, the master pressure chamber C1 is communicated with the hydraulic pressure circuit H1 for the wheels FR and RL, while the master pressure chamber C2 is communicated with the hydraulic pressure circuit H2 for the wheels FL and RR. According to the present embodiment, the hydraulic pressure circuit system is formed to provide a so-called diagonal circuit (X-circuit) system, while a front-rear dual circuit system may be formed. In the hydraulic pressure circuit H1, the master pressure chamber C1 is communicated with wheel brake cylinders Wfr and Wrl, through a main passage MF and its branch passages MFr and MFl, respectively. The proportional solenoid valve SC1 is disposed in the main passage MF. Also, the master pressure chamber C1 is communicated with a passage between check valves CV5 and CV6, which will be described later, through an auxiliary passage MFc, in which an input solenoid valve SI1 is disposed. Furthermore, in parallel with the proportional solenoid valve SC1, a check valve CV11 is disposed to allow the flow of the brake fluid supplied to the downstream, i.e., toward the wheel brake cylinders Wfr and Wrl, and prohibit the reverse flow of the brake fluid. Therefore, the brake fluid can be supplied through the check valve CV11, if the master cylinder pressure exceeds the pressure in the wheel brake cylinders Wfr and Wrl, even in the case where the proportional solenoid valve SC1 is placed in its closed position.

Furthermore, there are disposed in the branch passages MFr and MFl, respectively, normally open solenoid valves NOfr and NOrl, in parallel with which check valves CV1 and CV2 are disposed, respectively, to allow the flow of the brake fluid toward the master cylinder MC and prohibit the flow of the brake fluid toward the wheel brake cylinders Wfr and Wrl. Through the check valves CV1 and CV2, and the proportional solenoid valve SC1 placed in its open position, the brake fluid in the wheel brake cylinders Wfr and Wrl is returned to the master cylinder MC, and then to the atmospheric pressure reservoir RS. Therefore, when the brake pedal BP is released, the hydraulic pressure in the wheel brake cylinders Wfr and Wrl can be reduced immediately, in accordance with the decreased pressure in the master cylinder MC. Also, normally closed solenoid valves NCfr and NCrl are disposed in branch passages RFr and RFl, which are communicated with the wheel brake cylinders Wfr and Wrl, respectively. A drain passage RF gathered by the branch passages RFr and RFl is connected to a reservoir RS1, which is provided separately from the atmospheric pressure reservoir RS, and provided with a piston and a spring, to be capable of storing the brake fluid required for various controls, and which may be called as an accumulator.

The hydraulic pressure pump HP1 is connected at its input port through the input solenoid valve SI1 to a passage between the master cylinder MC and the linear proportioning solenoid valve SC1, and connected at its output port to a passage between the linear proportioning solenoid valve SC1 and the wheel brake cylinders Wfr and Wrl. And, the reservoir RS1 is connected to the input port of the hydraulic pressure pump HP1 through the check valves CV5 and CV6. The hydraulic pressure pump HP1 is driven by a single electric motor M together with the hydraulic pressure pump HP2, to introduce the brake fluid from its input port, and pressurize the same to be discharged from its output port.

The master cylinder MC is connected to a passage between the check valves CV5 and CV6 disposed at the inlet side of the hydraulic pressure pump HP1 through an auxiliary passage MFc and the input solenoid valve SI1. The check valve CV5 is provided for preventing the flow of the brake fluid toward the reservoir RS1 and allowing the reverse flow. The check valves CV6 and CV7 are provided for restricting the flow of the brake fluid discharged from the hydraulic pressure pump HP1 to a predetermined direction, and they are normally formed integrally with the hydraulic pressure pump HP1. Then, the input solenoid valve SI1 is normally placed in its closed position as shown in FIG. 1, where the communication between the master cylinder MC and the input port of the hydraulic pressure pump HP1 is blocked, and switched to its open position where the master cylinder MC is communicated with the input port of the hydraulic pressure pump HP1.

Likewise, in the hydraulic pressure circuit H2, there are disposed the linear proportioning solenoid valve SC2, an input solenoid valve SI2, a reservoir RS2, normally open solenoid valves NOfl and NOrr, normally closed solenoid valves NCfl and NCrr, check valves CV3, CV4, CV8-CV10 and a check valve CV12. The hydraulic pressure pump HP2 is driven by the electric motor M together with the hydraulic pressure pump HP1. Both of the pumps HP1 and HP2 will be driven continuously after the electric motor M starts to operate them. The linear proportioning solenoid valve SC2, the input solenoid valve SI2, the normally open solenoid valves NOfl and NOrr, and the normally closed solenoid valves NCfl and NCrr are controlled by the electronic control unit ECU1, to regulate the hydraulic pressure in the wheel brake cylinders Wfl and Wrr.

In operation, every solenoid valves are placed in their normal positions and the electric motor M is stopped as shown in FIG. 1, during the normal braking operation. When the brake pedal BP is depressed in this state, the linear proportioning solenoid valves SC1 and SC2 are placed in their positions, then the hydraulic pressure pumps HP1 and HP2 are actuated to discharge the hydraulic pressure to the hydraulic pressure circuits H1 and H2, and supply the same into the wheel brake cylinders Wfr and Wrl, and the wheel brake cylinders Wfl, Wrr, through the normally open solenoid valves NOfl and NOrr, and the solenoid valves NCfl and NCrr placed in their open positions, respectively. Then, the linear proportioning solenoid valves SC1 and SC2 are controlled by the electronic control unit ECU1 according to the stroke detected by the stroke sensor BS, to decrease the hydraulic pressure in each wheel brake cylinder, so that the wheel cylinder pressure is regulated into the pressure according to the amount of operation of the brake peal BP.

During the braking operation, when the anti-skid control is initiated, in a pressure decrease mode for instance, the normally open solenoid valve NOrl is placed in its closed position, and the normally closed solenoid valve NCrl is placed in its open position to communicate the wheel brake cylinder Wrl with the reservoir RS1 through the normally closed solenoid valve NCrl, whereby the brake fluid in the wheel brake cylinder Wrl is drained into the reservoir RS1 to reduce the hydraulic pressure in the wheel brake cylinder Wrl. When a pulse pressure increase mode is selected for the wheel brake cylinder Wrl, the normally closed solenoid valve NCrl is placed in its closed position and the normally open solenoid valve NOrl is placed in its open position, so that the hydraulic pressure discharged from the hydraulic pressure pumps HP1 is supplied to the wheel brake cylinder Wrl through the normally open solenoid valve NOrl. Then, the normally open solenoid valve NOrl is opened and closed alternately, so that the hydraulic pressure in the wheel brake cylinder Wrl is increased and held repeatedly like pulses thereby to be increased gradually. When a rapid pressure increase mode is selected for the wheel brake cylinder Wrl, the normally closed solenoid valve NCrl is placed in its closed position and the normally open solenoid valve NOrl is placed in its open position, so that the hydraulic pressure discharged from the hydraulic pressure pumps HP1 is supplied to the wheel brake cylinder Wrl. When the brake pedal BP is released, the linear proportioning solenoid valves SC1 is placed in its open position. And, when the master cylinder pressure comes to be lower than the pressure in the wheel brake cylinder Wrl, the brake fluid in the wheel brake cylinder Wrl is returned to the master cylinder MC through the check valve CV2 and the linear proportioning solenoid valve SC1 in its open position, and consequently to the atmospheric pressure reservoir RS. Thus, an independent braking force control is performed with respect to each wheel.

In the case where the hydraulic pressure control device including the stroke sensor BS, pressure sensor P and the electronic control unit ECU1 is failed, the master cylinder pressure is supplied from the master pressure chambers C1 and C2 into the wheel brake cylinders Wfr and Wrl, and the wheel brake cylinders Wfl and Wrr, through the linear proportioning solenoid valves SC1 and SC2 in their initial (open) positions, the solenoid valves NOfr and NOrl, and the solenoid valves NOfl and NOrr placed in their initial (open) positions, respectively.

Next will be explained overall operation of the brake apparatus as constituted above. At the out set, will be explained the braking operation in such a state that the regenerative braking operation is performed. When the brake pedal BP is depressed, the reaction force is applied by the first simulator spring SP1 according to the stroke of the brake pedal BP. In response to the operation of the brake pedal BP, the master piston MP1 is advanced through the vacuum booster VB, with the master pressure chambers C1 and C2 being communicated with the atmospheric pressure reservoir RS, so that the master cylinder pressure will not be discharged, before the brake pedal BP is advanced by the predetermined stroke. The amount of braking operation in the above case is detected by the stroke sensor BS, and the regenerative braking force is applied to each wheel according to the detected signal, i.e., the amount of braking operation.

Figure 3:
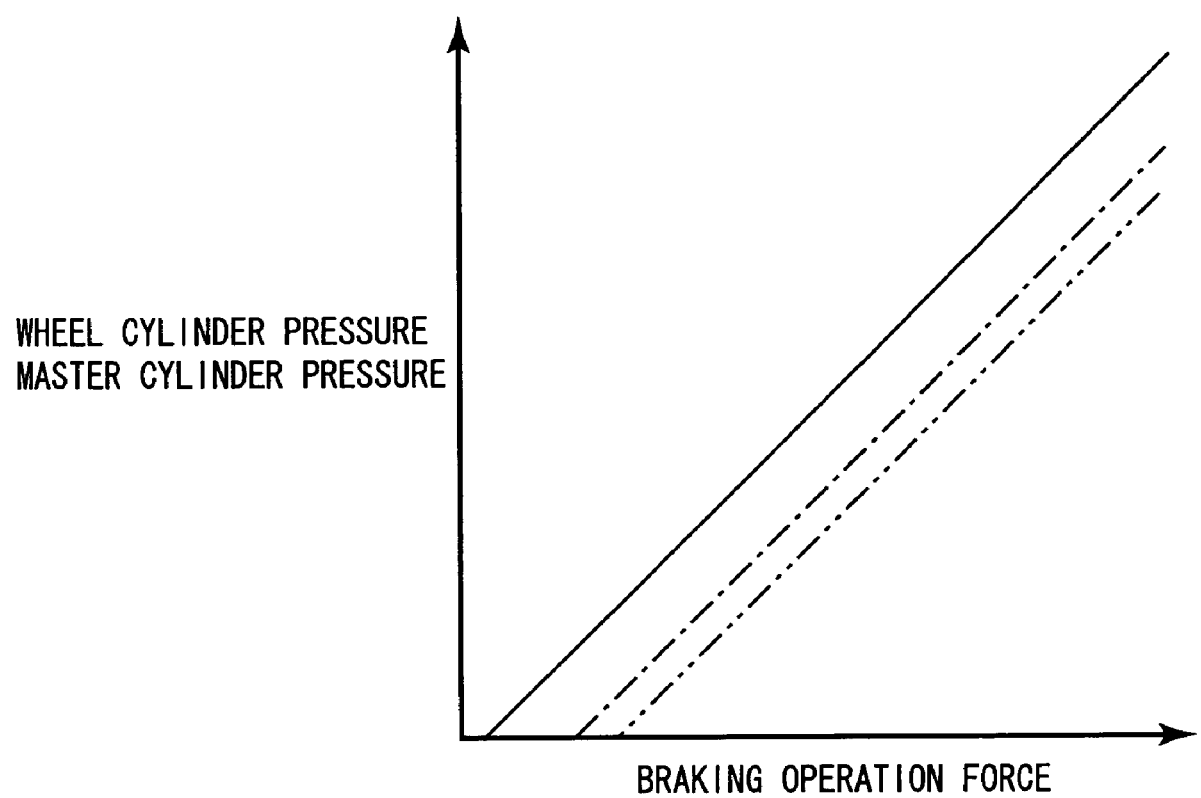
FIG. 3 is a diagram showing a characteristic of braking operation force and hydraulic pressure according to an embodiment of the present invention.

Then, if the brake pedal BP is operated to provide its stroke exceeding the amount for producing the maximal regenerative braking force, while the stroke is equal to or smaller than the predetermined stroke so that master cylinder pressure has not been discharged, the input solenoid valves SI1 and SI2, the linear proportioning solenoid valves SC1 and SC2, and the motor M are turned on, to control the electric current fed to the linear proportioning solenoid valves SC1 and SC2, so as to provide a characteristic of the wheel cylinder pressure as indicated by one-dot chain line in FIG. 3. Consequently, the hydraulic pressure in a relatively low pressure range of a large consumption of brake fluid such as in the wheel brake cylinders Wfr and so on, can be supplied from the atmospheric pressure reservoir RS. As there is a certain relationship between the stroke and the braking operation force of the brake pedal BP, the braking operation force can be converted from the value detected by the stroke sensor BS. Instead, a depression force sensor may be used. And, it may be so constituted that the input solenoid valves SI1 and SI2, the linear proportioning solenoid valves SC1 and SC2, and the motor M are turned on, when the brake pedal BP is depressed, and that electric current fed to the linear proportioning solenoid valves SC1 and SC2 are controlled such that the wheel cylinder pressure shall not be produced, until the brake pedal BP will be operated to provide the stroke exceeding the amount for producing the maximal regenerative braking force.

Furthermore, if the brake pedal BP is operated to provide a stroke exceeding the predetermined stroke, the hydraulic pressure is produced as indicated by two-dot chain line in FIG. 3. Therefore, the braking operation force can be calculated on the basis of the master cylinder pressure detected by the pressure sensor P, so that the electric current fed to each of the linear proportioning solenoid valves SC1 and SC2 is controlled such that the wheel cylinder pressure as indicated by the one-dot chain line in FIG. 3 will be produced. In this case, as the hydraulic pressure in the relatively low pressure range of the large consumption of brake fluid such as in the wheel brake cylinders Wfr and so on, has already been supplied, an appropriate stroke can be provided for the brake pedal BP. In FIG. 3, the two-dot chain line indicates a characteristic of the braking operation force—master cylinder pressure.

On the other hand, in the case where the vehicle speed is reduced to be low, or the case where a battery (indicated by BTR in FIG. 7) served as a power source for the electric motor has been charged enough, i.e., in a so-called fully charged state, so that the regenerative braking force is reduced or it can not be obtained, then the electric current fed to each of the linear proportioning solenoid valves SC1 and SC2 is increased, with the regenerative braking force being reduced, such that the wheel cylinder pressure will be increased, from the one-dot chain line toward a solid line in FIG. 3. In FIG. 3, the solid line indicates the characteristic of the braking operation force—wheel cylinder pressure in such a case that the regenerative braking force can not be obtained at all. In this case, the hydraulic pressure is supplied from the atmospheric pressure reservoir RS through the master cylinder MC, in such a range as being equal to or smaller than the predetermined stroke, the stroke of the brake pedal BP will not be varied. In the case where the wheel cylinder pressure is increased in such a range as exceeding the predetermined stroke, the hydraulic pressure is supplied from the master pressure chambers C1 and C2 through the hydraulic pressure pumps HP1 and HP2 into the wheel brake cylinders Wfr and so on, so that the brake pedal BP will stroke according to the amount of supply of the hydraulic pressure. However, as the hydraulic pressure in the relatively low pressure range of the large consumption of brake fluid such as in the wheel brake cylinders Wfr and so on, has already been supplied, the amount of supply of the hydraulic pressure is small enough to make the stroke variation of the brake pedal BP as small as the vehicle driver will not have an unusual feeling on the stroke variation.

In the case where the brake pedal BP is depressed rapidly, the hydraulic pressure in the master pressure chambers C1 will be increased, and then the hydraulic pressure in the master pressure chamber C2 is increased, even if the stroke of the brake pedal BP is equal to or smaller than the predetermined stroke, because the orifice OR is disposed between the master pressure chambers C1 and the atmospheric pressure reservoir RS. Also, in the case where the stroke of the brake pedal BP has exceeded the amount for producing the maximal regenerative braking force, or the case where the battery (BTR in FIG. 7) has been in the fully charged state, so that the regenerative braking force can not be obtained, even if the linear proportioning solenoid valves SC1 and SC2 are turned on, the hydraulic pressure in the master pressure chamber C1 which has been increased with the brake pedal BP depressed rapidly, will be supplied into the wheel brake cylinders Wfr and so on, through the check valves CV11 and CV12 disposed in parallel with the linear proportioning solenoid valves SC1 and SC2, respectively. Consequently, even in the case where the response of the regenerative braking operation or the hydraulic pressure pumps HP1 and HP2 to the rapid operation of the brake pedal BP is delayed, the wheel cylinder pressure can be increased appropriately.

According to the present embodiment, although the check valves CV11 and CV12 are disposed separately from the check valves formed within the hydraulic pressure pumps HP1 and HP2, the check valves within the pumps HP1 and HP2 may be used to act as the check valves CV11 and CV12. With the check valve CVo being disposed in parallel with the orifice OR, input property for the hydraulic pressure pump will be improved, when an automatic pressure increasing operation is performed for a vehicle stability control or the like.

Figure 4:
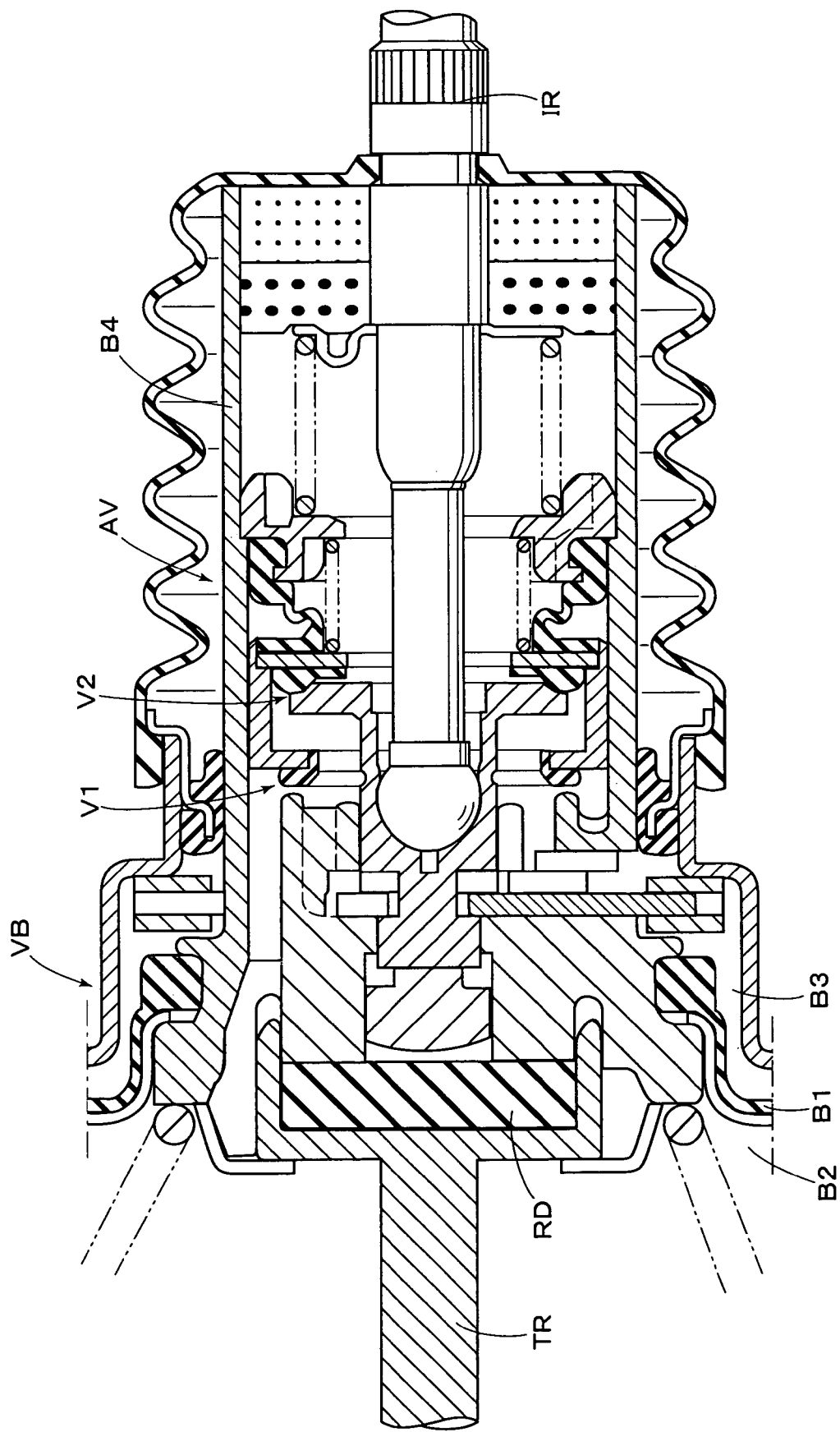
FIG. 4 is an enlarged sectional view of a portion of a vacuum booster according to an embodiment of the present invention.

FIG. 4 illustrates the structure of the vacuum booster VB, which includes a vacuum valve V1 for communicating the constant pressure chamber B2 with the variable pressure chamber B3, or blocking the communication between them, and an air valve V2 for communicating the variable pressure chamber B3 with the atmosphere, or blocking the communication between them. The vacuum booster VB includes a pressure control valve AV having a power piston B4, the vacuum valve V1, the air valve V2, a reaction disc RD for transmitting the reaction force to the master cylinder MC, and so on. In response to depression of the brake pedal BP (shown in FIGS. 1 and 2), therefore, the vacuum valve V1 and air valve V2 are actuated to produce a pressure difference between the constant pressure chamber B2 and the variable pressure chamber B3 according to the braking operation force of the brake pedal BP. As a result, the output force increased in response to depression of the brake pedal BP is transmitted to the master cylinder MC.

Accordingly, when an input rod IR is moved in response to depression of the brake pedal BP, a valve member of the air valve V2 is moved integrally with it. As a result, when the vacuum valve V1 is closed, the communication between the constant pressure chamber B2 and the variable pressure chamber B3 is blocked. When the input rod IR is moved further, the air valve V2 is opened to introduce the atmospheric air into the variable pressure chamber B3, and produce the pressure difference between the constant pressure chamber B2 and the variable pressure chamber B3, whereby the master piston MP1 is advanced through a transmission rod TR, to output the hydraulic pressure from the master cylinder MC.

Figure 5:
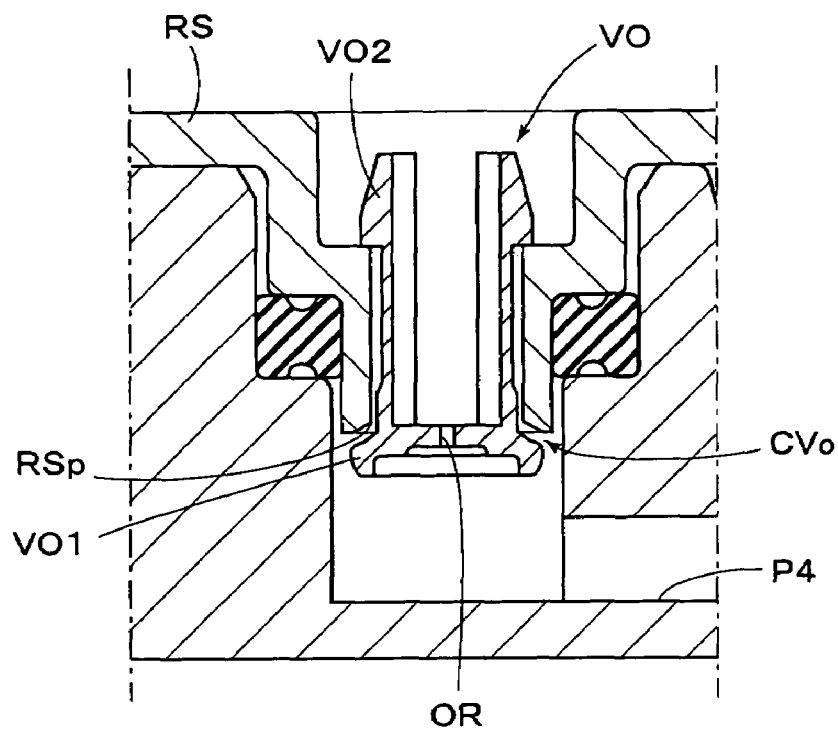
FIG. 5 is a sectional view of an embodiment of a valve member acting as an orifice and a second check valve according to an embodiment of the present invention.
Figure 6:
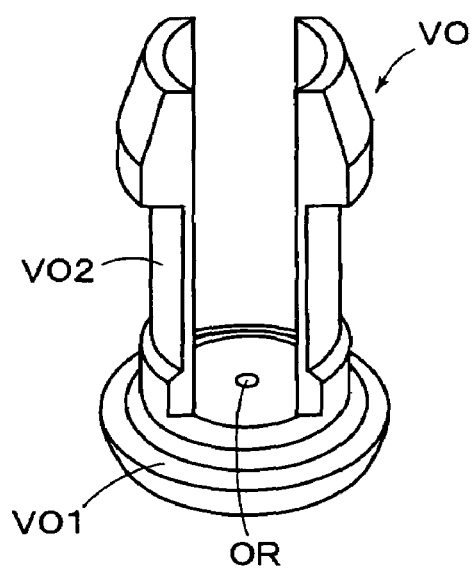
FIG. 6 is a perspective view of an embodiment of a valve member acting as an orifice and a second check valve according to an embodiment of the present invention.

The orifice OR and check valve CVo as shown in FIGS. 1 and 2 may be formed in a single device of a valve member VO as shown in FIGS. 5 and 6. On the bottom of the atmospheric pressure reservoir RS, a port RSp is formed to communicate with the port P4 of the housing HS, and the valve member VO is installed to open or close the port RSp. The valve member VO is made of material that is larger in specific gravity than the brake fluid, to form a valve body VO1 of a circular plate with the orifice OR defined in the center thereof, and a pair of columnar engaging portions VO2 extended vertically from the valve body VO1. With the valve member VO being inserted into the port RSp, as shown in FIG. 5, the tip ends of the engaging portions VO2 are supported to be capable of being engaged with the bottom of the atmospheric pressure reservoir RS, and capable of being moved by a small distance in the vertical direction in FIG. 5. For instance, in the case where there is no pressure difference between the front and rear ends (upper and lower ends in FIG. 5) of the valve member VO, the valve member VO is positioned by its own weight as shown in FIG. 5, so that a clearance is defined between the port RSp and the valve body VO1. Consequently, the brake fluid in the atmospheric pressure reservoir RS is fed into the port P4 through that clearance and the orifice OR. On the other hand, when the pressure at the end of the valve member VO facing the port P4 (lower end in FIG. 5) is rapidly increased, the valve body VO1 is forced to move upward in FIG. 5, so that the clearance between the port RSp and the valve body VO1 is shut off, to act as the check valve CVo. Thereafter, the port RSp and the port P4 are communicated with each other through only the orifice OR.

Figure 7:
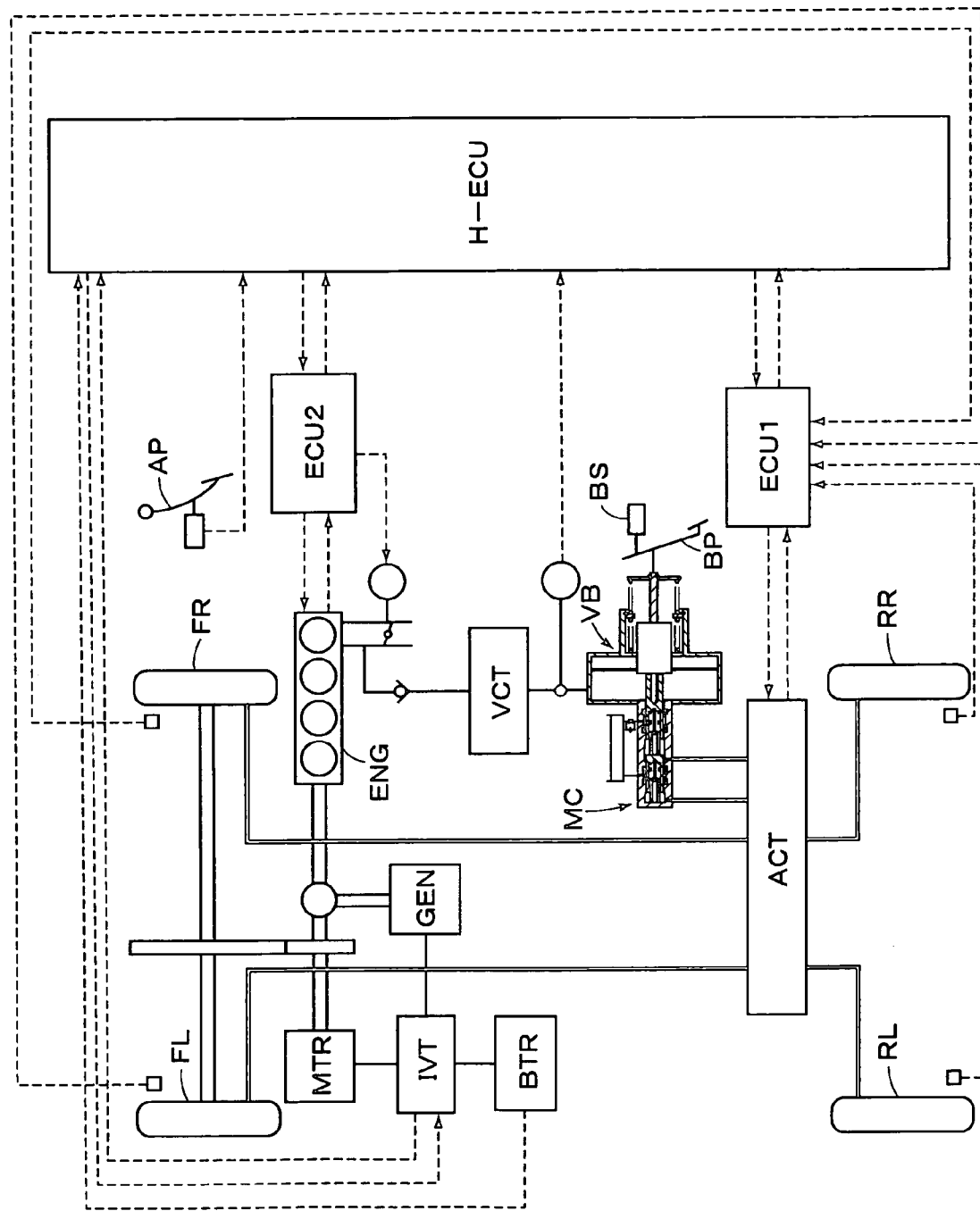
FIG. 7 is a schematic view of a hybrid vehicle provided with a brake apparatus according to an embodiment of the present invention.

FIG. 7 shows a vehicle having a so-called series-parallel hybrid system, which is capable of being directly driven by the engine and electric motor, and including the brake apparatus as shown in FIG. 1, which is capable of performing the regenerative braking cooperative control. Referring to FIG. 7, an overall structure will be explained schematically. According to the hybrid vehicle as described above, in addition to the engine ENG of internal combustion engine, it is provided with an electric motor MTR for applying a driving force to assist the engine ENG, and acting as a generator to produce the regenerative braking force, when braking the vehicle, thereby to act as the regenerative braking device. Also, it is provided with a generator GEN which is generated by the output of the engine ENG and served as a starter for starting the engine when it is to be started, and which is connected to the battery through an inverter IVT together with the electric motor MTR.

The actuator ACT includes the linear proportioning solenoid valve SC1 and so on as shown in FIG. 1, and is connected with the master cylinder MC. The vacuum booster VB is connected with the intake manifold of the engine ENG through a vacuum tank VCT. In addition to the electronic control unit ECU1 for the brake control as described before, an electronic control unit ECU2 for an engine control is provided, and both of the units are connected to an electronic control unit H-ECU for the hybrid control. According to the electronic control units H-ECU and ECU2, therefore, the engine ENG and electric motor MTR are controlled in response to operation of an accelerator pedal AP, to regulate the driving force. Also, according to the electronic control units H-ECU and ECU1, the actuator ACT is controlled, to regulate the hydraulic pressure, such that the hydraulic pressure corresponding to the regenerative braking force shall not be applied, when the regenerative braking control is being performed by the electric motor MTR.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake apparatus for a vehicle comprising:
a master cylinder having a master piston moved in response to operation of a manually operated braking member, and a master pressure chamber defined ahead of said master piston for generating hydraulic pressure according to an amount of advancing operation of said manually operated braking member including a stroke of said manually operated braking member;
wheel brake cylinders operatively mounted on wheels of said vehicle for applying braking force to said wheels, with the hydraulic pressure fed from said master pressure chamber;
an atmospheric pressure reservoir for storing brake fluid to supply the brake fluid to said master cylinder, said master pressure chamber being communicated with said atmospheric pressure reservoir when the stroke of said manually operated braking member is equal to or smaller than a predetermined stroke;
an electromagnetic valve disposed in a passage between said master pressure chamber and said wheel brake cylinders;
braking operation detection means for detecting the amount of operation of said manually operated braking member;
a hydraulic pressure pump with an output port thereof connected to a passage between said electromagnetic valve and said wheel brake cylinders;
control means for controlling said electromagnetic valve and said hydraulic pressure pump to supply the hydraulic pressure to said wheel brake cylinders according to the amount of operation of said manually operated braking member detected by said braking operation detection means, when the stroke of said manually operated braking member is equal to or smaller than the predetermined stroke;
an orifice provided in a passage between said master pressure chamber and said atmospheric pressure reservoir;
a first check valve disposed in parallel with said electromagnetic valve to allow a flow of the brake fluid from said master pressure chamber to said wheel brake cylinders, and prohibit a reverse flow of the brake fluid; and
regenerative braking means for collecting braking energy when said vehicle is braked, wherein the predetermined stroke is set to be larger than the stroke of said manually operated braking member at which said regenerative braking means generates a maximal regenerative braking force.

2. A brake apparatus as set forth in claim 1, wherein said hydraulic pressure pump has an input port connected to a passage between said master pressure chamber and said electromagnetic valve.

3. A brake apparatus as set forth in claim 2, further comprising a second check valve disposed in parallel with said orifice to allow a flow of the brake fluid from said atmospheric pressure reservoir to said master pressure chamber, and prohibit a reverse flow of the brake fluid.

4. A brake apparatus as set forth in claim 1, further comprising a stroke simulator having spring means for producing reaction force according to the stroke of said manually operated braking member.

5. A brake apparatus as set forth in claim 4, wherein said stroke simulator comprises two spring means with different mounting loads, wherein only one of said spring means is compressed when the stroke of said manually operated braking member is equal to or smaller than the predetermined stroke, and wherein both of said spring means are compressed, when the stroke of said manually operated braking member exceeds the predetermined stroke to reduce the increased amount of the reaction force relative to the increased amount of the stroke of said manually operated braking member.

6. A brake apparatus as set forth in claim 1, further comprising assisting means disposed between said manually operated braking member and said master cylinder for assisting the operation of said manually operated braking member.

7. A brake apparatus as set forth in claim 1, wherein the communication between the master pressure chamber and the atmospheric pressure reservoir is blocked when the stroke of the manually operated braking member is larger than the predetermined stroke.

8. A brake apparatus as set forth in claim 1, wherein the regenerative braking means applies regerative braking force to the wheels in response to the stroke of the manually operated braking member to collect the braking energy.

* * * * *